United States Patent

Ekelund

[11] Patent Number: 6,058,297
[45] Date of Patent: May 2, 2000

[54] RADIO RECEIVER FOR VEHICLE USE

[75] Inventor: Per Ekelund, Billdal, Sweden

[73] Assignee: AB Volvo, Sweden

[21] Appl. No.: 08/913,468

[22] PCT Filed: Mar. 13, 1996

[86] PCT No.: PCT/SE96/00324

§ 371 Date: Dec. 19, 1997

§ 102(e) Date: Dec. 19, 1997

[87] PCT Pub. No.: WO96/28899

PCT Pub. Date: Sep. 19, 1996

[30] Foreign Application Priority Data

Mar. 15, 1995 [SE] Sweden .................................. 9500911

[51] Int. Cl.[7] .................................................... H04B 7/08
[52] U.S. Cl. ................................ 455/277.2; 455/277.1; 455/278.1; 455/345
[58] Field of Search ............................. 455/277.1, 278.1, 455/277.2, 345, 575, 269, 272; 333/103; 343/876, 853

[56] References Cited

U.S. PATENT DOCUMENTS

| 3,946,390 | 3/1976 | Alexander et al. ...................... 343/702 |
| 4,403,343 | 9/1983 | Hamada ............................... 455/277.1 |
| 4,525,869 | 7/1985 | Hamada et al. ...................... 455/277.2 |
| 4,803,447 | 2/1989 | Schultz et al. ........................... 333/103 |
| 5,216,434 | 6/1993 | Fukumura .............................. 343/876 |
| 5,594,394 | 1/1997 | Sasaki et al. ........................... 333/103 |

FOREIGN PATENT DOCUMENTS

| 57-79739 | 5/1982 | Japan ............................. H04B 7/08 |
| 1-261944 | 10/1989 | Japan ............................. H04L 1/06 |
| 6-276166 | 9/1994 | Japan ............................. H04B 17/00 |

Primary Examiner—Fan S. Tsang
Assistant Examiner—Blane J. Jackson
Attorney, Agent, or Firm—Klarquist Sparkman Campbell Leigh & Whinston

[57] ABSTRACT

A vehicle mounted radio receiver comprising a diversity control circuit for detection of multi-path via two or more antennas (14,15). An antenna selector unit (13) is also arranged for selection of the strongest antenna signal. The antenna selector unit (13) is connected to a detecting circuit (18–21) comprising means for automatic locking of the antenna selector unit to a main antenna (14) when detecting interrupted function at a sub-antenna (15). The automatic locking to the main antenna of the vehicle is accomplished, either in that the detecting circuit for antenna function comprises an antenna signal amplifier which is connected to the sub-antenna (15) and to a source of power, or in that the detecting circuit for antenna function comprises a load circuit which is connected to the sub-antenna (15) and to a source of power.

9 Claims, 1 Drawing Sheet

RADIO RECEIVER FOR VEHICLE USE

FIELD OF THE INVENTION

The present invention refers to a vehicle mounted radio receiver comprising a diversity control circuit for detection of multi-path via two or more antennas, and an antenna selector unit for selection of the strongest antenna signal, which antenna selector unit is connected to a detecting circuit comprising means for automatic locking of the antenna selector unit to a main antenna when detecting interrupted function at a sub-antenna.

BACKGROUND OF THE INVENTION

When receiving radio waves with antenna in mobile vehicles, the problem with multi-path distortion arises. This term is used as a designation for the disturbance which arises as a result of interference of radio waves. The interference is caused by that the transmitted waves are travelling somewhat different routes from a transmitter to a receiver. At the receiver, waves are received that may have been reflected for example by near by mountain walls and/or buildings, causing the transmitted waves to travel different distances. The interference results in that maxima and minima arise with distances within a magnitude which can be estimated within the area that the normal car represents. This problem has been solved by the use of a system with multiple antennas for receiving radio waves in cars, so called diversity.

A known diversity system for active compensation comprises multiple antennas, usually a main antenna and a sub-antenna, that are connected to an antenna selector unit which is a part of a radio unit. The antenna selector unit is in its turn connected to a tuner which is connected to a multi-path detector, which mediates an in-signal to said selector unit, which consists of a decision-making circuit which determines which of said antennas will serve as receiving antenna. If multi-path distortion is detected by the detector, the selector unit will immediately switch from one receiving antenna to another, in order to eliminate the disturbing phenomenon, if possible.

Problems may arise when installing a radio having the diversity function, if a sub-antenna is missing. The system may be adaptable via a manual change over switch, so that the installer may adapt said system on one hand to vehicles with a single antenna, on the other hand to vehicles with multiple antennas. If the installation is not correct, the selector will either, in a vehicle with a single antenna, to pendulate between the antenna and a nonexistent sub-antenna, or in a vehicle with multiple antennas, to avoid activation of the sub-antenna. In both cases, the reception will be less efficient than intended.

A similar problem occurs if damage arises on the sub-antenna or its antenna cable in a system having multiple antennas. This will result in that the antenna selector pendulates between the main antenna and the damaged sub-antenna, which leads to more inferior receiving conditions than if the selector was set to single antenna.

It would be technically possible to provide a selector unit which could electro-mechanically detect if an antenna connector is connected to the antenna port. A drawback with this automatic detection, is that a connector may be inserted by mistake, which connector has no connection with an antenna. Also, there will be no adaption of the selector unit, if some fault occurs on the sub-antenna. Also in these cases, the selector unit will try to select the nonexistent respectively the damaged sub-antenna, when multi-path distortion has been detected.

U.S. Pat. No. 5,216,434 describes a receiver unit with an antenna selector for a radio receiver with diversity function. Each antenna is connected to a source of current. A fault detecting circuit is connected to the receiver unit, which circuit controls the potential at the current supply connectors for the antenna. At interruption of the antenna feeder cable, the detected potential is changed which is registered as a fault and is indicated by means of a LED. Then it is possible to manually switch off the multi-path function at the receiver unit. Thus, this prior art solution requires that the user both must know the reason for the fault indication, and also must be able to execute the manual switch off.

THE TECHNICAL PROBLEM

One purpose of the present invention is therefore to provide an antenna selector unit which automatically detects the presence of one or more functioning sub-antennas, and which automatically switches off the diversity function when a sub-antenna is missing.

THE SOLUTION

This is accomplished according to the invention, either in that the detecting circuit for antenna function comprises an antenna signal amplifier which is connected to the sub-antenna and to a source of power, or in that the detecting circuit for antenna function comprises a load circuit which is connected to the sub-antenna and to a source of power. In this way, an automatic locking is provided to the main antenna of the vehicle, when a sub-antenna is missing, or when an existing sub-antenna has interrupted function.

DESCRIPTION OF THE DRAWINGS

The invention will be described hereinafter with reference to embodiments shown in the enclosed drawings, wherein FIG. 1 schematically shows a system for mobile radio reception with diversity function and antenna selector unit according to prior art.

DESCRIPTION OF EMBODIMENTS

Figure 1:
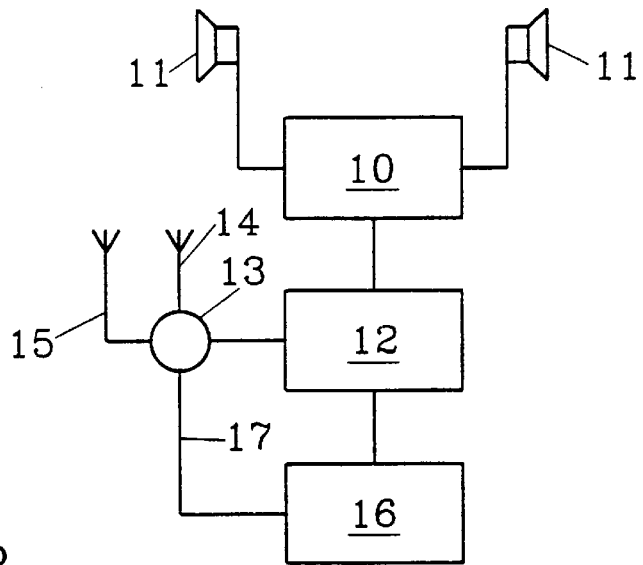

The conventional radio receiver shown in FIG. 1 comprises a main unit 10 with among other a pre-amplifier and a terminal amplifier with connected speakers 11. A tuner unit 12 is connected to the main unit 10 and is equipped with high frequency amplifier blocks for desired radio bands, mixer, oscillator and middle frequency amplifiers. An antenna selector unit 13 is connected to the tuner unit 12 and is provided with ports for two different antennas located in a vehicle at distances apart, a main antenna 14, and a subantenna 15. A multi-path detector 16 is connected both to the tuner unit 12 and to the antenna selector unit 13 via a control cable 17.

The detector 16 registers the presence of multi-path interferences at the tuner unit 12 and sends a control signal to the antenna selector unit 13 via the control cable 17 for switching from one antenna to the other.

In order to avoid unnecessary switching from the main antenna to the sub-antenna, either when such an antenna is not present, or if it is not working, the antenna selector unit 13 according to the invention is provided with a detecting circuit for detection of the function of the subantenna or its absence. During interruption of sub-antenna function or if it is absent, the antenna selector unit locks to the main antenna.

The antenna selector unit and the multi-path detector is provide with components which are known to the man in the field, that do not require any detailed functional description.

Figure 2:
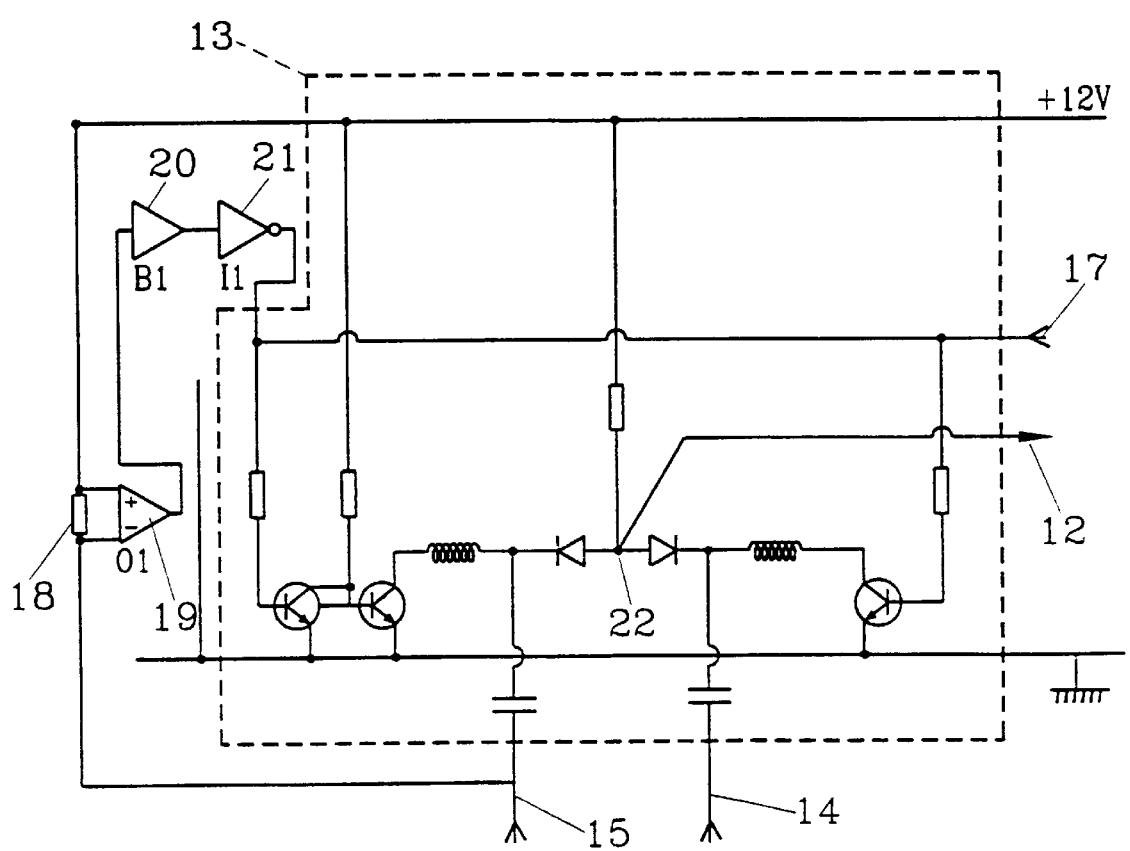
FIG. 2 shows in a block diagram an antenna selector unit with function detection and antenna locking according to one embodiment of the invention.

FIG. 2 shows one embodiment of an antenna selector unit according to the invention, having such a detection circuit. The feed voltage of the sub-antenna is superimposed onto the coaxial cable via a resistor 18. An operational amplifier 19 detects the voltage drop over the resistor 18.

If for example an antenna amplifier or another load circuit is connected to the coaxial cable of the sub-antenna, a current will flow through the resistor 18 which is registered as a voltage loss by the operational amplifier 19. The result of this measurement is an out-signal which is amplified in a buffer circuit 20, the outlet of which consequently becoming high. The amplified signal is then inverted by the inverter 21 to a low signal. The result will be that this low signal does not affect the normal function of the antenna selector unit, so that this is controlled according to the control signal from the multi-path detector 16 via the control cable 17.

If a sub-antenna 15 is absent, or if some fault has occurred in an existing sub-antenna, no current will flow through the resistor 18. The operational amplifier 19 then detects no voltage drop, and provides an out-signal which is amplified by the buffer circuit 20, the outlet of which consequently becoming low. The amplified low signal is then inverted by the inverter 21 to a high signal. The result will be that this high signal overrides the control signal from the multi-path detector 16 via the control cable 17, so that the antenna selector unit is locked onto the main antenna 14.

The antenna selector unit 13 is connected to the tuner unit 12 at the point 22.

The invention is not limited to the above described embodiment, instead more variants are conceivable within the scoop of the following claims. For example, the radio receiver and the antenna selector unit may be designed differently than what is shown.

I claim:

1. A vehicle mounted radio receiver comprising a diversity control circuit for detection of multi-path via two or more antennas, and an antenna selector unit for selection of the strongest antenna signal, wherein the antenna selector unit is connected to a detecting circuit comprising means for automatic locking of the antenna selector unit to a main antenna when detecting interrupted function at a sub-antenna wherein the detecting circuit for antenna function comprises an antenna signal amplifier which is connected to the sub-antenna and to a source of power.

2. A vehicle mounted radio receiver comprising a diversity control circuit for detection of multi-path via two or more antennas, and an antenna selector unit for selection of the strongest of signal, which antenna selector unit is connected to a detecting circuit and responsive to a control signal from the detecting circuit comprising means for automatic locking of the antenna selector unit to again antenna when detecting interrupted function at a sub-antenna wherein the detecting circuit for antenna function comprises a load circuit which is connected to the sub-antenna and to a source of power.

3. A radio receiver according to claim 1 or 2 wherein said means for automatic locking of the antenna selector unit to a main antenna forms a decision-making circuit which on the basis of the information which is received from the detection circuit, determines if a sub-antenna should be part of an antenna switching routine.

4. A vehicle mounted radio receiver for coupling to at least a main antenna and a sub-antenna, comprising:

a tuner;

a multi-path detector coupled to the tuner and providing an output control signal;

an antenna selector unit coupled to both the tuner and the multi-path detector, the antenna selector unit being responsive to the control signal from the multi-path detector for switching between the main and sub-antennas; and the antenna selector for detecting when the sub-antenna is disconnected and for overriding the control signal in response, to lock onto the main antenna.

5. The vehicle mounted radio of claim 4, further comprising a voltage source;

a resistor coupled between a voltage source and the sub-antenna;

an operational amplifier having a positive terminal coupled to one end of the resistor and a negative terminal coupled to an opposite end of the resistor;

wherein the operational amplifier outputs a signal indicative of a presence of the sub-antenna when the operational amplifier detects a current flow in the resistor; and wherein the operational amplifier outputs a signal indicative of the absence of the sub-antenna when the operational amplifier detects no current flowing in the resistor.

6. The vehicle mounted radio of claim 4 further including a main antenna and a sub-antenna coupled to the antenna selector unit.

7. A vehicle mounted radio receiver for coupling to at least a main antenna and a sub-antenna, comprising:

a tuner;

an antenna selector circuit coupled to the tuner for controlling the coupling of the main antenna or the sub-antenna to the tuner;

a detector coupled to the antenna selector circuit for performing a diversity function that determines which of the antennas serves as a receiving antenna and that sends a control signal to the antenna selector circuit in accordance with the determination; and the antenna selector detecting when the sub-antenna is disconnected and switching off the diversity function in response.

8. A method of switching antennas in a vehicle mounted radio receiver, comprising:

providing an antenna selector unit for switching between main and sub-antennas such that the selected antenna is a receiving antenna for the vehicle mounted radio receiver;

with both the main antenna and sub-antenna coupled to the antenna selector, controlling the antenna selector in response to an output of a multi-path detector to switch between the main and sub-antennas based on the antenna that is receiving the strongest signal;

with a sub-antenna disconnected from the antenna selector, overriding the controlling of the antenna selector by the multi-path-detector such that the antenna selector is forced to select the main antenna regardless of the output of the multi-path detector.

9. The method of claim 8, further including:

(a) detecting whether a current is flowing to the sub-antenna;

(b) if current is flowing to the sub-antenna, allowing the antenna selector to be controlled by the output of the multi-path detector;

(c) if current is not flowing in the sub-antenna, overriding the output of the multi-path detector to lock the antenna selector onto the main antenna.

* * * * *

UNITED STATES PATENT AND TRADEMARK OFFICE
CERTIFICATE OF CORRECTION

PATENT NO. : 6,058,297
DATED : May 2, 2000
INVENTOR(S) : Per Ekelund

It is certified that error appears in the above-identified patent and that said Letters Patent is hereby corrected as shown below:

| Col./Line | Error | Correction |
|---|---|---|
| 1/18 | that | delete "that" |
| 1/21 | near by | nearby |
| 1/47 | to | delete "to" |
| 1/49 | to | delete "to" |
| 2/46 | with among others | with, among others, |
| 3/2 | provide | provided |
| 3/33 | scoop | scope |

| Claims/Col./Line | | |
|---|---|---|
| 2/3/53 | again | a main |

Signed and Sealed this

Twenty-second Day of May, 2001

Attest:

NICHOLAS P. GODICI

Attesting Officer    Acting Director of the United States Patent and Trademark Office